United States Patent [19]

Larsen

[11] 4,450,598
[45] May 29, 1984

[54] LIP CONSTRUCTION FOR DOCK LEVELLER

[75] Inventor: Kurt K. Larsen, Pell City, Ala.

[73] Assignee: Blue Giant Equipment of Canada Ltd., Brampton, Canada

[21] Appl. No.: 412,503

[22] Filed: Aug. 30, 1982

[51] Int. Cl.$^3$ .............................................. E01D 1/00
[52] U.S. Cl. ..................................................... 14/71.1
[58] Field of Search ........................ 14/71.3, 71.1, 71.7

[56] References Cited

U.S. PATENT DOCUMENTS

| | | | |
|---|---|---|---|
| 2,592,919 | 4/1952 | Loomis et al. | 14/71.3 |
| 2,751,615 | 6/1956 | Kelley | 14/71.3 |
| 2,843,865 | 7/1958 | Loomis | 14/71.3 |
| 3,031,701 | 5/1962 | Fenton | 14/71.3 |
| 3,064,289 | 11/1962 | Burch et al. | 14/71.3 |
| 3,255,478 | 6/1966 | Lambert | 14/71.7 |
| 3,526,011 | 9/1970 | Alten | 14/71.3 |
| 4,257,136 | 3/1981 | Loblock | 14/71.3 |

Primary Examiner—Ernest R. Purser
Assistant Examiner—Beverly E. Hjorth

[57] ABSTRACT

A lip construction for pivotal connection to the ramp of a dock leveller is disclosed. The lip comprises upper and lower rectangular steel plates providing front and rear lip edge portions. Means is provided for securing the lip rear edge portion for pivotal connection to a dock leveller ramp. The steel plates are bent along their lengths to define first and second lip portions which are slightly angled relative to each other. The lower plate extends slightly outwardly of the upper plate front portion, where the upper plate is secured along its front portion to the lower plate extension. The upper plate is also secured to the lower plate along the first lip portion. This arrangement places the upper plate of the second lip portion in compression and corresponding lower plate in tension when a load is applied to the lip during use. The lip construction is lightweight compared to its load bearing capacity and is particularly useful on small dock leveller installations which are attached directly to the loading dock edge.

4 Claims, 3 Drawing Figures

LIP CONSTRUCTION FOR DOCK LEVELLER

FIELD OF THE INVENTION

This invention relates to a lip construction for pivotal connection to the ramp of a dock leveller.

BACKGROUND OF THE INVENTION

Dock levellers are commonly used in industry to bridge the gap and difference in height between the loading dock and the bed of the truck. U.S. Pat. No. 3,316,575 to Larsen et al discloses a type of mechanical dock leveller for this purpose. That type of dock leveller is for heavy-duty use and where the difference in height between the loading dock and the truck carrier bed is considerable. In situations where the difference in height between the truck bed and the loading dock are usually negligible, a smaller version of dock leveller may be used which is commonly referred to as a "mini dock" leveller. An example of such dock leveller is disclosed in U.S. Pat. No. 3,685,077. A shortened ramp portion has a lip pivotally connected thereto. The lip rests on the truck bed when the dock leveller is in use.

Another form of mini dock leveller, which is of integral construction for bridging the difference between platforms and truck bed, is disclosed in U.S. Pat. No. 2,709,410 to Fenton. That dock consists simply of a ramp portion with no pivotally mounted hinge thereon. To strengthen the dock, the plate portion is angled and has buttress portions along the side.

With the smaller dock levellers, weight of the ramp and lip portion is of concern, because the dock leveller is raised manually for subsequent lowering onto a truck bed. Normally the practice is to use a thick steel plate in the range of one-half inch to five eights inch thickness for the lip which can become quite heavy, i.e. 100 to 150 pounds.

Attempts have been made in strengthening lips for dock levellers, such as disclosed in Lambert, U.S. Pat. No. 3,225,478. Although there is no discussion in the disclosure, FIG. 8 of the patent drawings shows the use of a secondary plate portion welded to the underside of the lip to presumably strengthen the lip. The lip is used on a heavy-duty dock leveller so that the weight of the lip is of less concern in view of the hydraulic power lifting of the ramp and lip.

It is, therefore, desirable to provide a lightweight lip for dock leveller installations which has the load carrying characteristics of the lips used on heavier docks.

SUMMARY OF THE INVENTION

The lip construction, according to this invention, has increased load carrying capacities for its size and weight. The lip construction is designed for pivotal connection to the ramp of a dock leveller. The lip comprises upper and lower rectangular steel plates providing front and rear lip edge portions. Means is provided for securing the lip rear edge portion in a pivotal manner to a dock leveller ramp. The steel plates are bent along their lengths to define first and second lip portions which are slightly angled relative to each other. The lower plate extends slightly outwardly of the upper plate front portion. The upper plate is secured along its front portion to said lower plate extension and the upper plate is secured to the lower plate along the first lip portion. This arrangement places the plate of the second lip portion under compression and the lower plate of the second lip portion under tension when a load is applied to the lip during use. Such construction has greater load carrying capacities for the weight of the steel plates used in the lip construction.

BRIEF DESCRIPTION OF THE DRAWINGS

Preferred embodiments of the invention are described in the drawings, wherein.

DETAILED DESCRIPTION OF THE PREFERRED EMBODIMENTS

Figure 1:
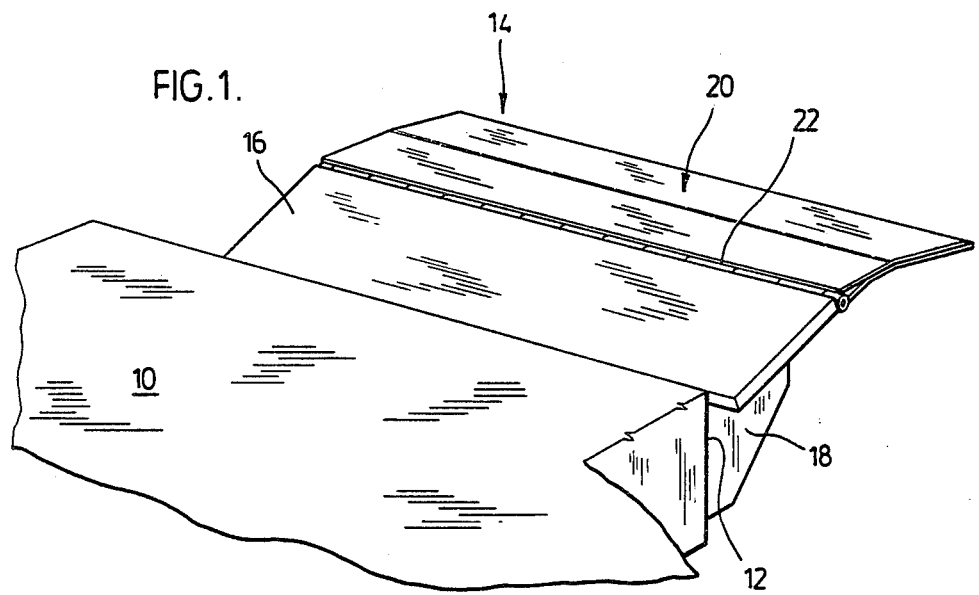
FIG. 1 is a perspective view of a dock leveller attached to the edge of a loading dock installation.

FIG. 1 shows the installation of a "mini dock" leveller on the edge of a dock loading station. The dock loading station has a platform 10 and a front face 12. The dock leveller 14 is secured to the front face 12 of the dock in accordance with standard practices. The mini dock 14 includes a ramp 16 which is connected to a support which is secured to the front face 12 of the dock. This connection may have the facility to permit the ramp to tilt slightly when the truck is sloped relative to the dock. Triangular support portions 18 are located inwardly of each side of the ramp 16 to support the ramp in the horizontal position when the dock leveller is not in use. The triangular support portions 18 are also secured directly to the front face 12 of the loading dock. Pivotally connected to the ramp 16 is the lip 20. A piano-type hinge arrangement 22 is used in pivotally connecting the lip to the ramp portion 16.

Figure 2:
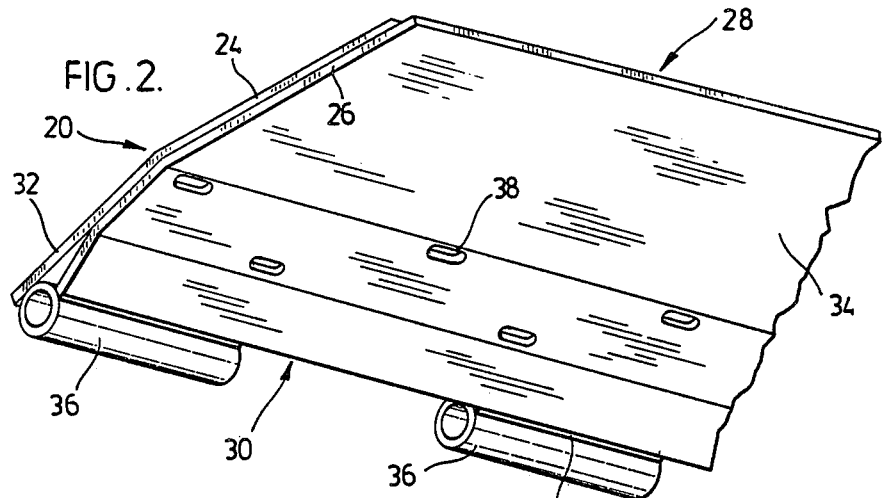
FIG. 2 is a perspective view of the underside of the lip of the dock leveller of FIG. 1.

As shown in FIG. 2, the lip 20 comprises an upper steel plate 24 and a lower steel plate 26. The plates are arranged to provide a front edge portion 28 for the lip and a rear edge portion 30 for the lip. The lip consists of two portions defined by the rectangular plates being bent along their lengths. The lip has a first portion 32 and a second portion 34. Secured to the rear edge 30 of the lip construction are tubular sleeves 36 which are used in pivotally connecting the lip 20 to the ramp 16. Apertures 38 are provided in the lower plate 26 for use in plug welding the lower plate to the upper plate 24 for reasons to be discussed.

Figure 3:
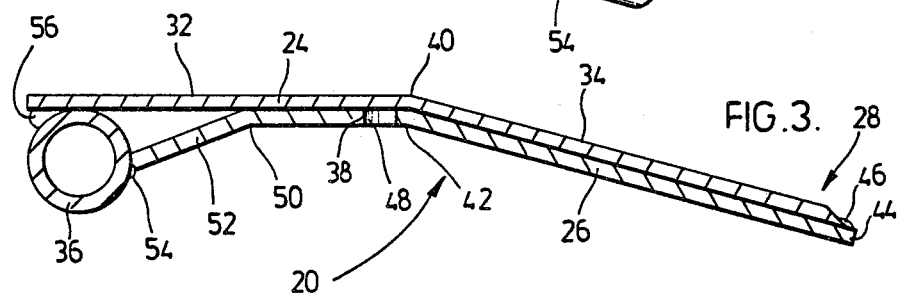
FIG. 3 is a section of the lip of FIG. 2.

Turning to FIG. 3, the construction and relationship of the lip plates is shown in more detail. The upper surface of the lip 20 consists of a first planar portion 32 and a second planar portion 34 where the portions are slightly angled relative to each other. The upper plate 24 is bent at apex 40 and correspondingly the lower plate 26 is bent at apex 42, so that the plates lie evenly upon one another. The lower plate 26 extends slightly beyond the upper plate 24 at the front edge 28 of the lip. This provides a lower plate extension 44 which extends slightly beyond the upper plate 24. The upper plate is welded to the lower plate extension 44 by a fillet weld 46. As is appreciated by those skilled in the art, such connection could also be made by rivets.

The lower plate 26 is welded to the upper plate 24 in the area of the first lip portion 32 by way of plug welds 48. The plug welds are formed by firstly cutting apertures 38 in the lower plate 26 in a zigzag manner along the first lip portion. Weld is then formed in the aperture 38 to connect the upper plate 24 to the lower plate 26. As with the lip front edge portion, instead of plug welds 48, rivets may be used to secure the plates together in the first lip portion 32.

In connecting the composite lip construction to the hinge sleeves 36, the lower plate is spread from the upper plate. To accomplish this, the lower plate is bent at 50 to provide a gussett portion 52 which is welded at 54 to the sleeve 36. The upper plate 24 extends rearwardly from apex 40 and is welded to the sleeve at 56. This arrangement provides for a secure connection of the composite lip construction to the hinge sleeves 36.

It has been found that the lip construction of this invention has considerably improved load bearing capacity. In terms of solid sheet material, the lip construction made of quarter inch plates is equivalent in load carrying capacity to a five eights of an inch solid plate. Thus the lip construction of this invention is lighter, yet has significantly increased load carrying capacibilities. In addition, it has been found that the construction provides a resilient arrangement in that the lip construction springs back to its original position after flexing when a load is applied thereto.

It is believed that the increased load carrying capacity and resilient characteristics of the lip is due to welding the upper plate to the lower plate at the front edge 28 and along the first portion of the lip. When the lip construction is placed under load, the upper plate in the area of lip portion 34 is placed under compression and the corresponding lower plate is placed under tension between the interconnected points of the upper and lower plates. In addition, the gusset portion 52 of the lower plate, as connected to the hinge sleeve 36, considerably increased the strength of the connection of the lip to the hinge sleeve 36.

With the lower plate 26 extending beyond the upper plate 24, the weld 46 is placed in compression so that the weld is not appreciably weakened during use of the lip construction because the extension 44 is the portion of the lip which rests on the truck bed. On the other hand, if the lower plate 26 were shorter than the upper plate 24 and welded thereto, it would be the upper plate 24 which would rest on the truck and thus when the lip is loaded, the weld would be placed in tension which would considerably weaken the weld during use and result in failure.

According to the preferred embodiment, the lip construction has been shown in use with a "mini dock" leveller. It is appreciated, of course, that the lip construction may be used with the larger dock levellers having somewhat longer ramp portions. If desired, the load carrying capacity of the lip construction can be increased by using correspondingly thicker plate portions.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A lip for pivotal connection to the ramp of a dock leveller, said lip comprising upper and lower rectangular steel plates secured together and in overlapping relationship along the substantial length thereof to provide front and rear lip edge portion, said plates being separated at the rear lip edge portion by means for pivotally connecting said lip to a dock leveller ramp, said upper plate being slightly bent in the length thereof to define an upper plate first planar portion secured adjacent one end thereof to said connecting means and a second planar portion, said first planar portion and said second planar portion forming a slight angle therebetween on the underside of said upper plate, said lower plate being bent in the length thereof to define a first lower plate portion connected to said connecting means and contacting said upper plate first portion intermediate the length thereof, a second lower plate portion underlying the remaining upper plate first portion and a third portion underlying the upper plate second portion and extending slightly therebeyond adjacent the front lip edge portion, said lower plate second portion and the overlapping upper plate first portion being welded and said upper plate second portion and said lower plate third portion being welded, the welded plates cooperating to place said upper plate in compression and said lower plate in tension when a load is applied to the upper plate of said lip during use.

2. A lip as claimed in claim 1, said lower plate second portion and said upper plate first portion being plug welded at a number of positions in the width of said plates.

3. A lip as claimed in claim 1 or 2, said lower plate extending beyond said upper plate to expose a portion of the top surface of said lower plate, said upper plate being welded to said lower plate adjacent said lip front edge portion by a fillet weld between the exposed portion of said lower plate and the front edge of said upper plate.

4. A lip as claimed in claim 1 or 2, wherein said upper plate overlies said pivoting means.

* * * * *